(12) United States Patent
Kerenidis (10) Patent No.: US 11,687,816 B2
(45) Date of Patent: Jun. 27, 2023

(54) QUANTUM DATA LOADER

(71) Applicant: QC Ware Corp., Palo Alto, CA (US)

(72) Inventor: Iordanis Kerenidis, Paris (FR)

(73) Assignee: QC Ware Corp., Palo Alto, CA (US)

( * ) Notice: Subject to any disclaimer, the term of this patent is extended or adjusted under 35 U.S.C. 154(b) by 353 days.

(21) Appl. No.: 16/987,235

(22) Filed: Aug. 6, 2020

(65) Prior Publication Data

US 2021/0319351 A1 Oct. 14, 2021

Related U.S. Application Data

(63) Continuation of application No. 16/986,553, filed on Aug. 6, 2020.

(60) Provisional application No. 63/007,325, filed on Apr. 8, 2020.

(51) Int. Cl.
*G06N 10/00* (2022.01)
*G06F 17/16* (2006.01)
*G06N 10/20* (2022.01)

(52) U.S. Cl.
CPC .............. *G06N 10/00* (2019.01); *G06F 17/16* (2013.01); *G06N 10/20* (2022.01)

(58) Field of Classification Search
CPC ......... G06F 17/16; G06F 17/18; G06N 10/00; G06N 10/20; G06N 10/40; G06N 10/60; G06N 3/084
See application file for complete search history.

(56) References Cited

U.S. PATENT DOCUMENTS

| 10,540,604 B1 | 1/2020 | Papageorge et al. |
| 2003/0011398 A1 | 1/2003 | Herr |
| 2013/0246495 A1 | 9/2013 | Svore et al. |
| 2014/0280427 A1 | 9/2014 | Bocharov et al. |

FOREIGN PATENT DOCUMENTS

| WO | WO 2019/204282 A1 | 10/2019 |
| WO | WO 2020/010208 A1 | 1/2020 |

OTHER PUBLICATIONS

Huggins et al., "Towards quantum machine learning with tensor networks", Jan., 9, 2019, Quantum Sci. Technol. 4 (2019), pp. 1-16. (Year: 2019).*
Khalid et al., "FPGA emulation of quantum circuits", Nov., 8, 2004, IEEE International Conference on Computer Design: VLSI in Computers and Processors, 2004. ICCD 2004. Proceedings, pp. 1-6 (Year: 2004).*
Ostaszewski, M et al., "Quantum Circuit Structure Learning" arXic:1905.09692v2, Oct. 4, 2019, pp. 1-11.
PCT Invitation to Pay, PCT Application No. PCT/US21/22548, May 27, 2021, two pages.
Bravyi, S. et al., "Hadamard-free circuits expose the structure of the Clifford group," arXiv:2003.09412, Mar. 20, 2020, pp. 1-34.

(Continued)

*Primary Examiner* — Brent Johnston Hoover
(74) *Attorney, Agent, or Firm* — Fenwick & West LLP (57) ABSTRACT

This disclosure relates generally to the field of quantum algorithms and quantum data loading, and more particularly to constructing quantum circuits for loading classical data into quantum states which reduces the computational resources of the circuit, e.g., number of qubits, depth of quantum circuit, and type of gates in the circuit.

24 Claims, 9 Drawing Sheets

```
T  : |0|1|2|3|4|5|6|7|8|9|10|11|12|13|14| q0 : -X-B-B-@-@-@-----------------------
         | | | |
q1 : ---|-S-|-|-|-@-@-@-------------------
         |   | | |
q2 : ----S-B-|-|-|-|-|-@-@---@-----------
             | | | | |   | |
q3 : ------S-|-|-|-|-|-|-|---@---@---@---
             | | | | | | |   |   |   |
q4 : -X------B-B-|-B-B-|-B-B----B---B---|---
                 |     |     |     |   |
q5 : ------------|-S-|-|-S-|-|-S---|--S---|---
                 |   | |   | |     |     |
q6 : ------------S---B-S---B-S-----B--S-----B---
                     |     |       |        |
q7 : ----------------S------S--------S---------S--

T  : |0|1|2|3|4|5|6|7|8|9|10|11|12|13|14|
```

(56) References Cited

OTHER PUBLICATIONS

PCT International Search Report and Written Opinion, PCT Application No. PCT/US21/22548, dated Jul. 28, 2021, 21 pages.
Foxen, B. et al., "Demonstrating a Continuous Set of Two-qubit Gates for Near-term Quantum Algorithms," arXiv:2001.08343v2, Feb. 3, 2020, pp. 1-20.
Pai, D. et al., "Parallel fault-tolerant programming of an arbitrary feedforward photonic network," arXiv:1909.06179, Sep. 11, 2019, pp. 1-15.
Barz, S. "Quantum Computing with Photons: Introduction to the Circuit Model, the One-Way Quantum Computer, and the Fundamental Principles of Photonic Experiments." Journal of Physics B: Atom, Molecular and Optical Physics, vol. 48, No. 8, Mar. 20, 2015, pp. 1-25.
Bouland, A. et al. "Prospects and Challenges of Quantum Finance." arXiv Preprint arXiv:2011.06492v1, Nov. 12, 2020, pp. 1-49.
PCT International Search Report and Written Opinion, PCT Application No. PCT/US2021/060614, dated Sep. 20, 2022, 16 pages.
Ramos-Calderer, S. et al. "Quantum Unary Approach to Option Pricing." arXiv Preprint arXiv:1912.01618v3, Jul. 29, 2020, pp. 1-26.
United States Office Action, U.S. Appl. No. 16/986,553, filed Oct. 14, 2022, eight pages.
Wikipedia. "Beam Splitter." Wikipedia: The Free Encyclopedia, Dec. 1, 2016, 5 pages, [Online] [Retrieved Oct. 23, 2017], Retrieved from the Internet <URL:https://en.wikipedia.org/w/index.php?title=Beam_splitter&oldid=752554574>.

\* cited by examiner

QUANTUM DATA LOADER

CROSS-REFERENCE TO RELATED APPLICATION

This application is a continuation of U.S. patent application Ser. No. 16/986,553, "Quantum Data Loader," filed on Aug. 6, 2020 which claims priority under 35 U.S.C. § 119(e) to U.S. Provisional Patent Application Ser. No. 63/007,325, "Quantum Data Loader," filed on Apr. 8, 2020, each of which is hereby incorporated by reference in its entirety.

BACKGROUND

1. Technical Field

This disclosure relates generally to the field of quantum algorithms and quantum data loading, and more particularly to constructing quantum circuits for loading classical data into quantum states which reduces the computational resources of the circuit, e.g., number of qubits, depth of quantum circuit, and type of gates in the circuit.

2. Description of Related Art

Many quantum machine learning and optimization algorithms load classical data into quantum states in order to use quantum procedures for tasks like classification, clustering, or solving linear systems. This makes these algorithms not near-term, since the proposals for such loaders, also called Quantum Random Access Memory (QRAM), are large and complex circuits both in the number of qubits and the depth of the quantum circuit. For example, conventional QRAM circuits have depths of O(n) where n is the dimension of a vector that represents a classical data point.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

The figures depict various embodiments for purposes of illustration only. One skilled in the art will readily recognize from the following discussion that alternative embodiments of the structures and methods illustrated herein may be employed without departing from the principles described herein, for example, by changing the specifics of the BS gate.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Here we describe a new circuit construction for loading classical data on quantum computers that can reduce both the number of qubits and the depth of the quantum circuit. Part 1: Methods for Loading Classical Data Into Quantum States In one aspect, a classical data point is represented by an n-dimensional vector $(x_1, x_2, \ldots, x_n)$ where $x_i$ is a real number and the Euclidean norm of the vector is 1. For clarity of presentation of this particular aspect, we will assume that n is a power of 2, but our methods can extend to the general case.

From the classical data point $(x_1, x_2, \ldots, x_n)$, we will describe a specific implementation of a circuit that can efficiently create the quantum state that encodes this classical data, namely create the state $$\sum_{i=1}^{n} x_i |e_i\rangle \qquad (1)$$

where $e_i$ is the unary representation of i. Other equivalent circuits of the same family can also be constructed.

The first step is to compute classically a set of angles $(\theta_1, \theta_2, \ldots, \theta_{n-1})$, from the classical data point $(x_1, x_2, \ldots, x_n)$. In one aspect, the angles are computed in the following way:

First, we compute an intermediate series $(r_1, r_2, \ldots, r_{n-1})$ that will help us in the calculations in the following way. We start by defining the last n/2 values $(r_{n/2}, \ldots, r_{n-1})$. To do so, we define an index j that takes values in the interval [1, n/2] and define the values $$r_{\frac{n}{2}+j-1}$$

as $$r_{\frac{n}{2}+j-1} = \sqrt{x_{2j}^2 + x_{2j-1}^2} \qquad (2)$$

Note that for j=1, we get the definition of $r_{n/2}$, for j=2 we get the definition of $r_{n/2+1}$, all the way to j=n/2, where we get the definition of $r_{n-1}$.

For the first n/2−1 values, namely the values of ($r_1$, $r_2$, ..., $r_{n/2-1}$), we define again and index j that takes values in the interval [1,n/2] and define the values as $$r_j = \sqrt{r_{2j+1}^2 + r_{2j}^2} \qquad (3)$$

We can now define the set of angles ($\theta_1$, $\theta_2$, ..., $\theta_{n-1}$) in the following way. We start by defining the last n/2 values ($\theta_{n/2}$, ..., $\theta_{n-1}$). To do so, we define an index j that takes values in the interval [1, n/2] and define the values $$\theta_{\frac{n}{2}+j-1}$$

as $$\theta_{\frac{n}{2}+j-1} = \arccos\left(\frac{x_{2j-1}}{r_{\frac{n}{2}+j-1}}\right), \text{ if } x_{2j} \text{ is postive and} \qquad (4)$$

$$\theta_{\frac{n}{2}+j-1} = 2\pi - \arccos\left(\frac{x_{2j-1}}{r_{\frac{n}{2}+j-1}}\right), \text{ if } x_{2j} \text{ is negative} \qquad (5)$$

For the first n/2−1 values, namely the values of ($\theta_1$, $\theta_2$, ..., $\theta_{n/2-1}$), we define again and index j that takes values in the interval [1,n/2] and define the values as $$\theta_j = \arccos\left(\frac{r_{2j}}{r_j}\right) \qquad (6)$$

Similar ways of defining the values of the angles are possible and fall into the same method as ours.

We can now define two different quantum circuits for loading the classical data point ($x_1$, $x_2$, ..., $x_n$) into the quantum state $$\sum_{i=1}^{n} x_i |e_i\rangle.$$

We will use one type of parameterized two-qubit gate that we call BS($\theta$) and has the following description:

$$BS(\theta) = [[1,0,0,0],[0,\cos(\theta),\sin(\theta),0],[0,-\sin(\theta),\cos(\theta),0],[0,0,0,1]] \qquad (7)$$

Note that one can use other similar gates that are derived by permuting the rows and columns of the above matrix, or by introducing a phase element $e^{i\varphi}$ instead of the "1" at matrix position (4,4), or by changing the two elements $\sin(\theta)$ and $-\sin(\theta)$ to for example $i*\sin(\theta)$ and $i*\sin(\theta)$. All these gates are practically equivalent and our method can use any of them. Here are some specific examples of alternative gates, however, this list is not exhaustive:

$$BS_1(\theta) = [[1,0,0,0],[0,\cos(\theta),-i*\sin(\theta),0],[0,-i*\sin(\theta),\cos(\theta),0],[0,0,0,1]] \qquad (8)$$

$$BS_2(\theta) = [[1,0,0,0],[0,\cos(\theta),\sin(\theta),0],[0,\sin(\theta),-\cos(\theta),0],[0,0,0,1]] \qquad (9)$$

$$BS_3(\theta,\varphi) = [[1,0,0,0],[0,\cos(\theta),-i*\sin(\theta),0],[0,-i*\sin(\theta),\cos(\theta),0],[0,0,0,e^{-i\varphi}]] \qquad (10)$$

$$BS_4(\theta,\varphi) = [[1,0,0,0],[0,\cos(\theta),\sin(\theta),0],[0,-\sin(\theta),\cos(\theta),0],[0,0,0,e^{-i\varphi}]] \qquad (11)$$

We will also use an X gate in the circuit which may be defined as X=[[0, 1], [1, 0]].

In some cases, we will also use a controlled version of the gate BS($\theta$) which we call c-BS($\theta$). Similar to other control gates, this gate is defined as:

$$c\text{-}BS(\theta) = |0\rangle\langle 0| \otimes Id + |1\rangle\langle 1| \otimes BS(\theta) \qquad (12)$$

In other words, this is a three-qubit gate where if the first qubit (called control qubit) is in the state $|0\rangle$, then the Identity matrix (Id) is applied in the second and third qubits (target qubits), and if the first qubit is $|1\rangle$ then the gate BS($\theta$) is applied in the second and third qubits.

An example method for constructing the circuit is the following, we will denote it as the "parallel" loader. We start with all qubits initialized to the 0 state. In the first step, we apply an X gate on the first qubit. Then, the circuit is constructed by adding BS gates in layers, using the angles θ we have constructed before. The first layer has 1 BS gate, the second layer has 2 BS gates, the third layer has 4 BS gates, until the log n-th layer that has n/2 gates. The total number of BS gates is n−1, exactly the same number of angles θ we have computed before. The qubits to which the gates are added follow a tree structure (e.g., a binary tree structure). In the first layer we have one BS gate between qubits (0,n/2) with angle $\theta_1$, in the second layer we have two BS gates between (0,n/4) with angle $\theta_2$ and (n/2,3n/4) with angle $\theta_3$, in the third layer there are four BS gates between qubits (0,n/8) with angle $\theta_4$, (n/4,3n/8) with angle $\theta_5$, (n/2,5n/8) with angle $\theta_6$, (3n/4,7n/8) with angle $\theta_7$, and so forth for the other layers.

Figure 1A:
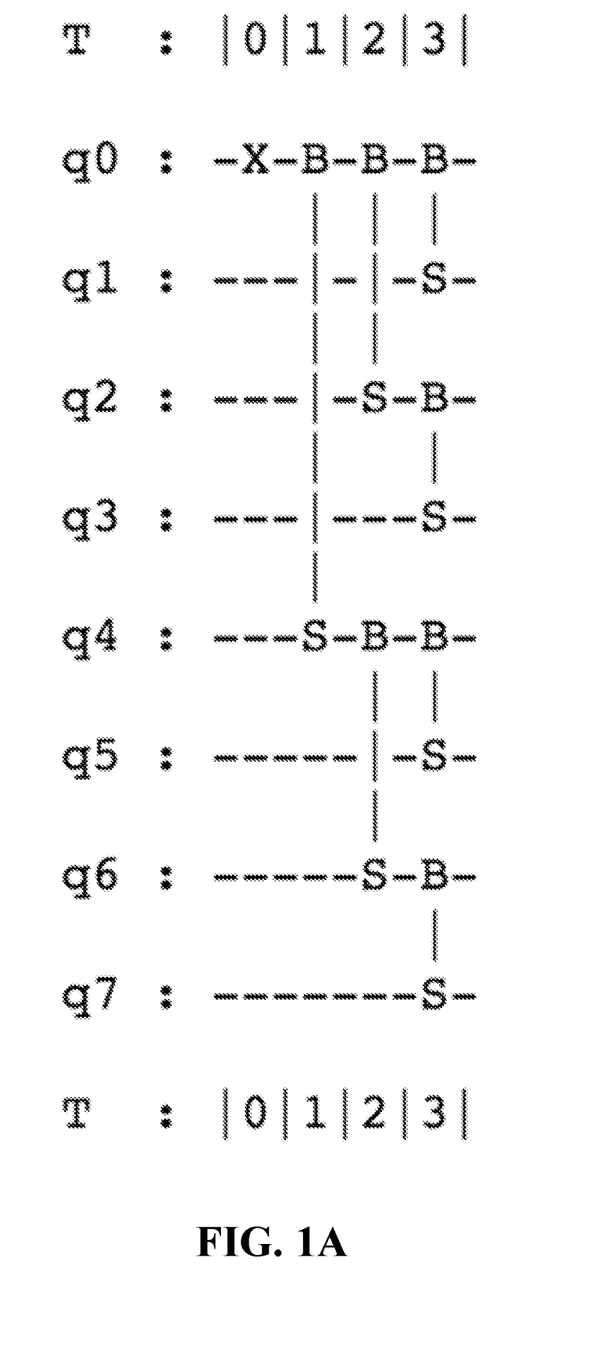
FIG. 1A is a diagram showing a quantum circuit used for loading classical data into a quantum state, using a single parameterized two-qubit gate (referred to as "BS"), according to an embodiment.

FIG. 1A provides one specific implementation of our method for loading an 8-dimensional data point ($x_1$, $x_2$, ..., $x_8$). In FIG. 1A, T is the time step, q0-q7 are the qubits, X is an X gate, and the vertical lines indicate which qubits the BS gates are applied to. Similar notation is used for FIGS. 1B-3. In FIG. 1A, an X gate is applied to qubit q0 in a first layer and subsequent layers apply BS gates according to a binary tree pattern where the root node of the tree is q0. The gates BS in FIG. 1A going from left to right and from top to bottom have as parameters the angles ($\theta_1$, $\theta_2$, ..., $\theta_7$) as can be calculated from our description above or similarly. The number of qubits used for the quantum circuit, the depth of the circuit and the number of two-qubit and three-qubit gates are given below for different dimensions and in the general case:

For dimension 8: qubits=8; depth=4; number of two-qubit gates=7; 3-qubit gates=0.

Dimension 1024: qubits=1024; depth=11; two-qubit gates=1023; 3-qubit gates=0.

Dimension n: qubits=n; depth=log(n)+1; 2-qubit gates=n−1; 3-qubit gates=0.

Since the depth of a circuit may correspond to the running time or time complexity of the circuit, the vector may be converted to a quantum state in ~O (log(n)).

The following is a description of an example quantum circuit for the parallel loader: a quantum circuit is formed for use in encoding an n-dimensional vector representing classical data into quantum states for n qubits. The quantum circuit includes n qubits, a first layer comprising an X gate applied to one of the qubits, and a plurality of subsequent layers. The plurality of subsequent layers applies BS gates to the qubits according to a binary tree pattern, where each BS gate is a single parameterized 2-qubit gate and the number of subsequent layers is not more than ceiling ($\log_2$ (n)). In some embodiments, this quantum circuit is a portion of a larger quantum circuit that includes additional layers.

A second example method for constructing the circuit is the following, that we denote as the "second" loader. We assume that $(x_1, x_2, \ldots, x_n)$ is such that n is a power of 4, in other words $\sqrt{n}$ is a power of 2. We will use two sets of qubits of size $\sqrt{n}$ each. We start with all qubits initialized to the 0 state. We first apply an X gate on the first and middle qubit. Then, we apply the parallel loader from the previous construction on the first $\sqrt{n}$ qubits with the first $\sqrt{n}$ angles. The circuit is constructed by adding BS gates in layers on the first $\sqrt{n}$ qubits, using the first $\sqrt{n}$ angles θ we have constructed before. The first layer has 1 BS gate, the second layer has 2 BS gates, the third layer has 4 BS gates, until the log $\sqrt{n}$-th layer that has $\sqrt{n}/2$ gates. Then we use each one of the first $\sqrt{n}$ qubits as a control qubit to apply sequentially a controlled version of the parallel loader using the second group of $\sqrt{n}$ qubits as target qubits. To apply the controlled version of the parallel loader we apply the controlled version of each BS(θ) gate.

For the second loader, the total number of BS gates is $\sqrt{n}-1$, and the total number of c-BS gates is $\sqrt{n}(\sqrt{n}-1)$, for a total number of gates equal to n−1 (not including the X gate), exactly the same number of angles θ computed before. The qubits to which the gates are added follow the same tree structures as in the parallel loader. The first tree is applied on the first $\sqrt{n}$ qubits, and then there are $\sqrt{n}$ more tree structures that are all applied on the second $\sqrt{n}$ qubits sequentially, each time controlled with one of the qubits from the first $\sqrt{n}$ ones.

The above construction can also be made to work when n is not a power of 4 and also when we have two sets of qubits not of equal size as before, but, for example, of sizes t and n/t (note that the product still equals n).

Figure 1B:
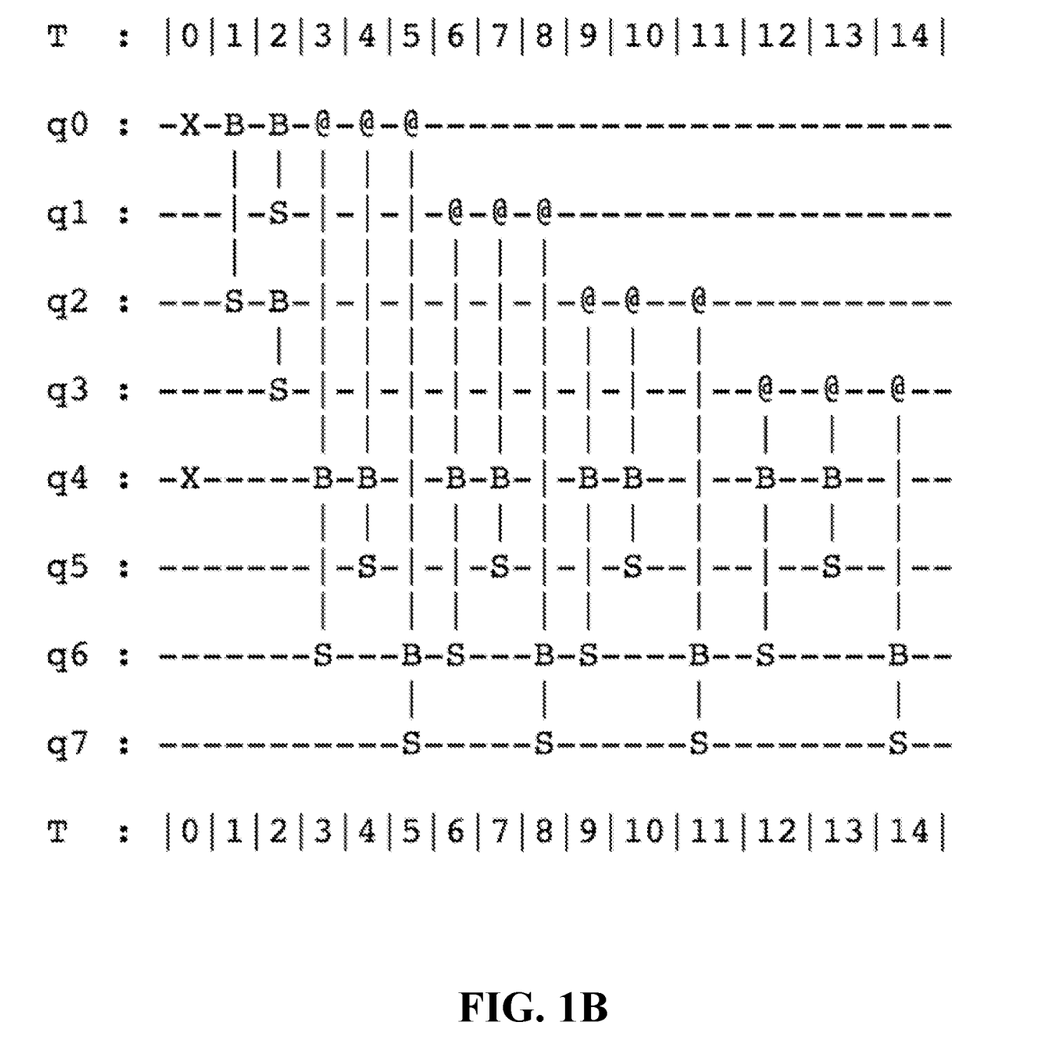
FIG. 1B is a diagram showing a quantum circuit used for loading classical data into a quantum state, using a single parameterized two-qubit gate and its controlled version (referred to as "c-BS"), according to a different embodiment.

FIG. 1B provides one example implementation of our method for loading a 16-dimensional data point $(x_1, x_2, \ldots, x_{16})$.

The gates BS and c-BS in FIG. 1B going from left to right and from top to bottom have parameters the angles $(\theta_1, \theta_2, \ldots, \theta_{15})$ as can be calculated from our description above or similarly. Note that "@" indicates the control qubit for each c-BS gate.

The depth of the circuit in FIG. 1B can be improved by noticing that many gates are applied on different qubits (for example gates on times 4 and 8, or 5 and 7, etc.) and thus can be re-arranged so that the circuit will have a total depth of $O(\sqrt{n} \log n)$.

The number of qubits used for the quantum circuit, the depth of the circuit, and the number of two-qubit and three-qubit gates are given below in the general case:

Dimension n: qubits=$2\sqrt{n}$; depth=$O(\sqrt{n} \log(n))$; 2-qubit gates=$\sqrt{n}-1$; 3-qubit gates=$\sqrt{n}(\sqrt{n}-1)$; total number of 2- and 3-qubit gates: n−1.

Since the depth of a circuit may correspond to the running time or time complexity of the circuit, the vector may be converted to a quantum state in $\sim O(\sqrt{n} \log n)$ using only $2\sqrt{n}$ qubits.

The following is a description of an example quantum circuit for the second loader: a quantum circuit is formed for use in encoding an n-dimensional vector representing classical data into quantum states. The quantum circuit includes a first group of $\sqrt{n}$ qubits, a second group of $\sqrt{n}$ qubits, a first layer comprising a first X gate applied to a qubit in the first group, a second X gate applied to a qubit in the second group, a first plurality of subsequent layers, and a second plurality of subsequent layers. The first plurality of subsequent layers applies BS gates to the first group of qubits according to a binary tree pattern, where each BS gate is a single parameterized 2-qubit gate. The second plurality of subsequent layers applies controlled BS gates (c-BS gates) to qubits in the first and second groups, where each c-BS gate applies a BS gate to qubits in the second group and is controlled by a qubit in the first group and the number of layers in the circuit is not more than ceiling($\sqrt{n} \log_2(n)$). In some embodiments, this quantum circuit is a portion of a larger quantum circuit that includes additional layers.

Part 2: Applications of Methods for Loading Classical Data Into Quantum States

We show how to use the quantum data loader described in Part 1 in order to perform a number of fundamental procedures that are useful among others in machine learning and optimization, including applications in distance estimation, inner product estimation, linear algebra, classification, clustering, neural networks, and many more. These are only some of the possible applications and more can be determined based on the method we describe here. The below descriptions use the parallel loader for convenience. Other quantum data loader embodiments, such as the second loader, can also be used to perform these procedures.

1. Distance Estimation

First Embodiment

In one aspect, we have as input two n-dimensional vectors $(x_1, x_2, \ldots, x_n)$ where $x_i$ is a real number and $(y_1, y_2, \ldots, y_n)$ where $y_i$ is a real number and the Euclidean norms of the vectors are respectively $$\|x\|^2 = \sum_{i=1}^{n} |x_i|^2 \text{ and } \|y\|^2 = \sum_{i=1}^{n} |y_i|^2.$$

One can define different types of distances between data points and here, in one aspect, we define the distance between these two data points in the following way:

$$d^2(x, y) = \frac{\|x - y\|^2}{2(\|x\|^2 + \|y\|^2)} = \frac{\sum_{i=1}^{n} |x_i - y_i|^2}{2(\|x\|^2 + \|y\|^2)} \tag{13}$$

Figure 2:
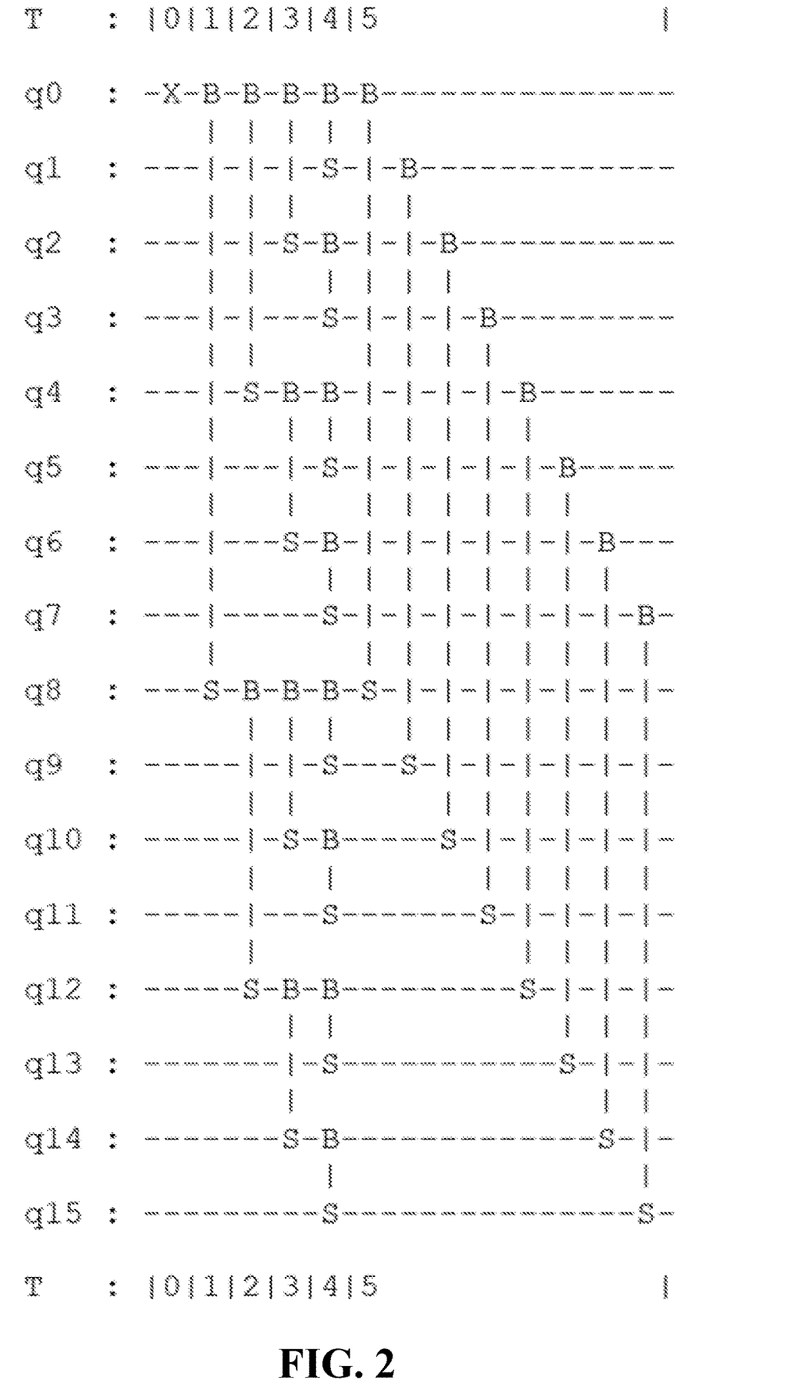
FIG. 2 is a diagram showing one way of applying the quantum data loader to estimating the distance (or equivalently the inner product) between two data points, according to an embodiment.

FIG. 2 provides one specific implementation of our method for estimating the distance between two 8-dimensional data point $x=(x_1, x_2, \ldots, x_8)$ and $y=(y_1, y_2, \ldots, y_8)$. In this implementation, the first gate BS on the left (at T=1) has a parameter $\theta_0$=arccos $$\left( \frac{\|x\|}{\sqrt{\|x\|^2 + \|y\|^2}} \right).$$

The parameters of the gates BS in the top half of the circuit (related to q0-q7) in FIG. 2 correspond to the parameters of the quantum data loader for the vector $(x_1, x_2, \ldots, x_n)$. The gates BS in the bottom half of the circuit (related to q8-q15) in FIG. 2 correspond to the parameters of the quantum data loader for the vector $(y_1, y_2, \ldots, y_n)$. The last set of BS gates at the rightmost part of the circuit (at T=5) in FIG. 2 have θ=π/4. The last set of BS gates may be performed in parallel during a single time step.

The outcome of the circuit described in FIG. 2 is the following quantum state $$\frac{1}{2}\left( \sum_{i=1}^{n} |x_i - y_i| |00000000 e_i\rangle + \sum_{i=1}^{n} |x_i + y_i| |e_i 00000000\rangle \right) \tag{14}$$

The probability hence of observing all 0s in the first half of the qubits is exactly $d^2(x,y)/4$.

The number of qubits used for the quantum circuit, the depth of the circuit and the number of two-qubit and three-qubit gates are given below for different dimensions and in the general case:

For dimension 8: qubits=16; depth=6; number of two-qubit gates=23; 3-qubit gates=0.

Dimension 1024: qubits=2048; depth=13; two-qubit gates=3071; 3-qubit gates=0.

Dimension n: qubits=2n; depth=log(n)+3; 2-qubit gates=3n−1; 3-qubit gates=0.

Since the depth of a circuit may correspond to the running time or time complexity of the circuit, the distance between two vectors can thus be determined in ~O(log(n)).

The following is a description of a quantum circuit according to this first embodiment: a quantum circuit is formed for use in encoding a first n-dimensional vector representing classical data into a first quantum state of n qubits, encoding a second n-dimensional vector representing classical data into a second quantum state of n qubits, and determining a distance between the first n-dimensional vector and the second n-dimensional vector. The quantum circuit includes 2n qubits, a first layer comprising an X gate applied to one of the qubits, a first group of subsequent layers, and an additional layer. The first group of subsequent layers applies BS gates to the qubits according to a binary tree pattern, where each BS gate is a single parameterized 2-qubit gate. The additional layer is after the first group and it applies B S gates in parallel to pairs of qubits, where a first qubit in a pair is associated with a first quantum state and a second qubit in a pair is associated with a second quantum state. The number of layers in the circuit is not more than ceiling(log$_2$(n)+3). In some embodiments, this quantum circuit is a portion of a larger quantum circuit that includes more layers.

Second Embodiment

In one aspect, we have as input two n-dimensional vectors $(x_1, x_2, \ldots, x_n)$ where each $x_i$ is a real number and $(y_1, y_2, \ldots, y_n)$ where each $y_i$ is a real number and the Euclidean norms of the vectors are respectively $$\|x\|^2 = \sum_{i=1}^{n} |x_i|^2 \text{ and } \|y\|^2 = \sum_{i=1}^{n} |y_i|^2.$$

One can define the inner product between the two vectors as $$(x, y) = \|x\|\|y\|\langle x, y\rangle = \sum_{i=1}^{n} x_i y_i,$$

where $\langle x, y \rangle$ is the inner product between the normalized vectors.

Figure 3:
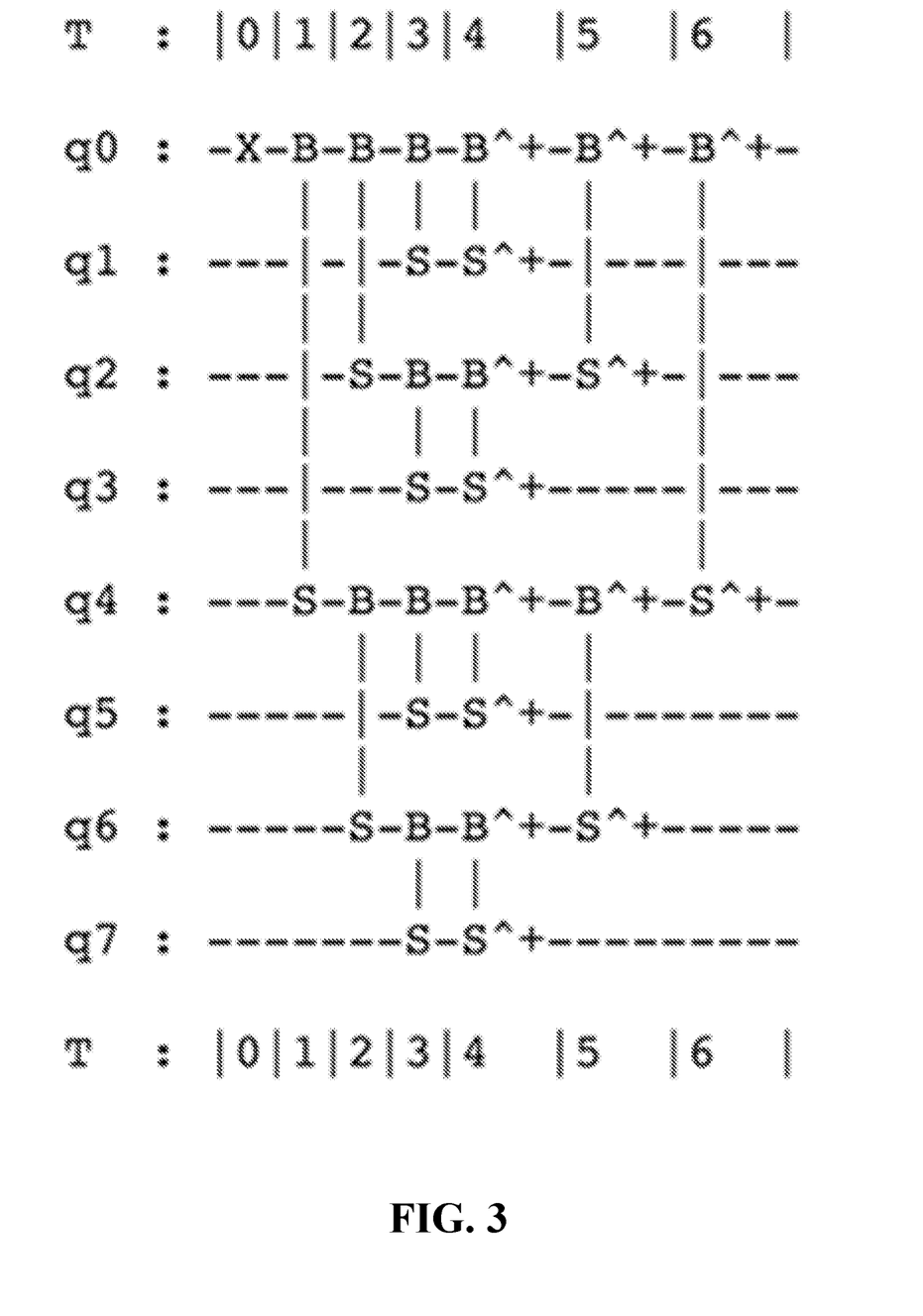
FIG. 3 is a diagram showing one way of applying the quantum data loader to estimating the distance (or equivalently the inner product) between two data points, according to another embodiment.

FIG. 3 provides one specific implementation of our method for estimating the distance between two 8-dimensional data points $x=(x_1, x_2, \ldots, x_8)$ and $y=(y_1, y_2, \ldots, y_8)$. In this implementation we have: the first half of the circuit corresponds to the parallel loader for the normalized vector x, as in FIG. 1A, and the second half of the circuit corresponds to the complex conjugate of the loader for vector y.

In other words, the circuit is created by reversing the order of the gates for the loader of y and conjugating each gate.

The conjugate of the gate BS(θ) is denoted as BS$^+$(θ) and is equal to $$BS^+(\theta)=[[1,0,0,0],[0,\cos(\theta),-\sin(\theta),0],[0,\sin(\theta),\cos(\theta),0],[0,0,0,1]] \quad (15)$$

The outcome of the circuit described in FIG. 3 is the following quantum state $$\langle x,y\rangle |e_1\rangle + \sqrt{1-\langle x,y\rangle^2}|e_1^\perp\rangle \quad (16)$$

where $|e_1^\perp\rangle$ is any state orthogonal to $|e_1\rangle$.

Thus, the probability of measuring the state $|e_1\rangle$ gives us the square of the inner product between the two normalized vectors and using the information about their norms we can output an estimator for the inner product $(x,y)$.

One could also change the above construction to one that estimates directly the distance by considering the vectors $x=(\|x\|, x_1, x_2, \ldots, x_n)$ and $y=(\|y\|, y_1, y_2, \ldots, y_n)$ and now the probabilities of the measurement outcomes become proportional to $d^2(x,y)$.

The number of qubits used for the quantum circuit, the depth of the circuit and the number of two-qubit and three-qubit gates are given below for different dimensions and in the general case:

For dimension 8: qubits=8; depth=7; number of two-qubit gates=14; 3-qubit gates=0.

Dimension 1024: qubits=1024; depth=21; two-qubit gates=2046; 3-qubit gates=0.

Dimension n: qubits=n; depth=2 log(n)+1; 2-qubit gates=2n−2; 3-qubit gates=0.

Thus, the time complexity of this circuit may be ~O(2 log(n)). While the time complexity is doubled compared to the first embodiment, the number of qubits is reduced by half.

The following is a description of a quantum circuit according to this second embodiment: a quantum circuit is formed for use in encoding a first n-dimensional vector representing classical data into a first quantum state of n qubits, encoding a second n-dimensional vector representing classical data into a second quantum state of n qubits, and determining a distance between the first n-dimensional vector and the second n-dimensional vector. The quantum circuit includes n qubits, a first layer comprising an X gate applied to one of the qubits, a first group of subsequent layers, and a second group of subsequent layers. The first group of subsequent layers applies BS gates to the qubits according to a binary tree pattern, where each BS gate is a single parameterized 2-qubit gate. The second group of subsequent layers applies conjugate BS gates to the same qubits according to the inverse of a binary tree pattern, where each BS gate is a single parameterized 2-qubit gate. The number of layers is not more than ceiling(2 log$_2$ (n)+1). In some embodiments, this quantum circuit is a portion of a larger quantum circuit that includes additional layers.

2. Inner Product Estimation

The distance of two data points and their inner product are related by the mathematical formula:

$$\text{Inner product} = (\|x\|^2 + \|y\|^2) * \left(\frac{1}{2} - d^2(x, y)\right) \quad (17)$$

And hence the inner product (in addition to the distance) can be estimated. For example, the inner product can be determined for two 8-dimensional data points using the circuit in FIG. 2 or in FIG. 3.

3. Matrix-Matrix Multiplication

One can use the previous inner product estimation quantum method to provide an application in linear algebra, namely Matrix-Matrix multiplication, where given two matrices A and B, one needs to compute C=AB. In one aspect, the method can be embodied in a hybrid classical-quantum way, where for each row of the matrix $A_i$ and each column of the matrix $B_j$ one can invoke the quantum method for inner product estimation to compute each element of the matrix C as $C_{ij}=A_iB_j$.

By performing matrix multiplication via the distance estimation method described above, the operation may be performed with a time complexity of $\sim O(n^2 \log(n))$. This is a significant improvement compared to conventional matrix multiplication algorithms, which have time complexities of $\sim O(n^3)$.

4. Classification

The distance estimation method we presented above can be readily used to provide applications for classification. We describe here one of the many possible embodiments of this application.

In one aspect, one can use the known Nearest Centroids algorithm where the classification of a data point is performed by computing the distances of the data point to all centroids and choosing the centroid with minimum distance. One can use the distance estimation method described above to provide a hybrid classical-quantum classification algorithm, where the quantum method described with respect to FIG. 2 or 3 is used to classify data points.

5. Clustering

The distance estimation method we presented above can be readily used to provide applications for clustering. We describe herein one of the many possible applications.

In one aspect, one can use a hybrid classical-quantum algorithm based on the well-known k-means algorithm. There, the quantum distance estimation method described above with respect to FIG. 2 or 3 can be used both for assigning data points to centroids (as in the case of classification) and for updating the centroids, where matrix-matrix multiplication is used.

6. Neural Network Training and Evaluation

The inner product estimation method we presented above can be used to provide applications in neural networks. We describe here one of the many possible embodiments of this application.

In one aspect, one can use a hybrid classical-quantum algorithm based on the well-known feed-forward and back-propagation algorithm. There, the quantum inner product estimation method described above with respect to FIGS. 2 and 3 can be used both for multiplying the matrices of data points and weights during the evaluation, and during the backpropagation algorithm (which may be gradient descent algorithm) where again matrix-matrix multiplication is used.

Alternative embodiments of our methods disclosed herein will be readily recognized as viable alternatives that may be employed without departing from the principles of what is disclosed.

Part 3: Hardware Implementations of a Quantum Data Loader

We show how the quantum data loader can be implemented with different types of current quantum hardware, including with superconducting qubits or photonics. These are only some of the possible hardware implementations and more can be easily constructed based on the same method we describe here or for different qubit technologies, including for trapped ions or atoms.

1. Implementation with Superconducting Qubits

A gate within the family that we call $BS(\theta)$ may be used to couple two superconducting qubits in a way that the following gate can be applied directly for any parameter $\theta$:

$$fSIM(\theta,\varphi)=[[1,0,0,0],[0,\cos(\theta),-i*\sin(\theta),0],[0,-i*\sin(\theta),\cos(\theta),0],[0,0,0,e^{-i\varphi}]] \quad (18)$$

Thus, the quantum data loader, as described in Part 1, can be implemented using these gates, albeit a new connectivity may be needed with respect to the current connectivity of the superconducting qubit machines, which are connected as a 2-D grid.

Our hardware proposal for the quantum data loader may necessitate superconducting qubits that are connected in a tree structure (and not a grid) and with the capacity to apply the family of $BS(\theta)$ gates we defined above.

Figure 4A:
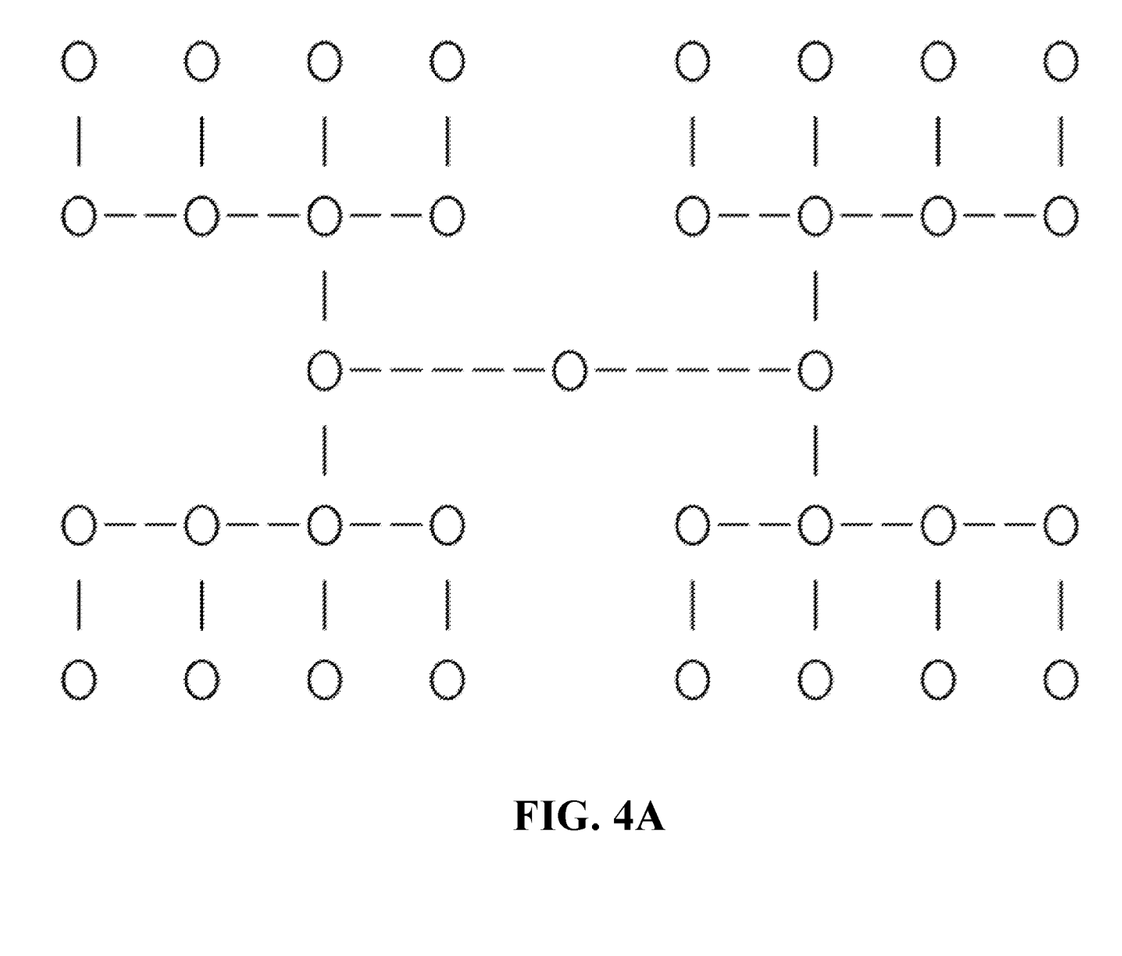
FIGS. 4A and 4B are diagrams showing a possible hardware implementation of the quantum data loader using superconducting qubits, according to some embodiments.
Figure 4B:
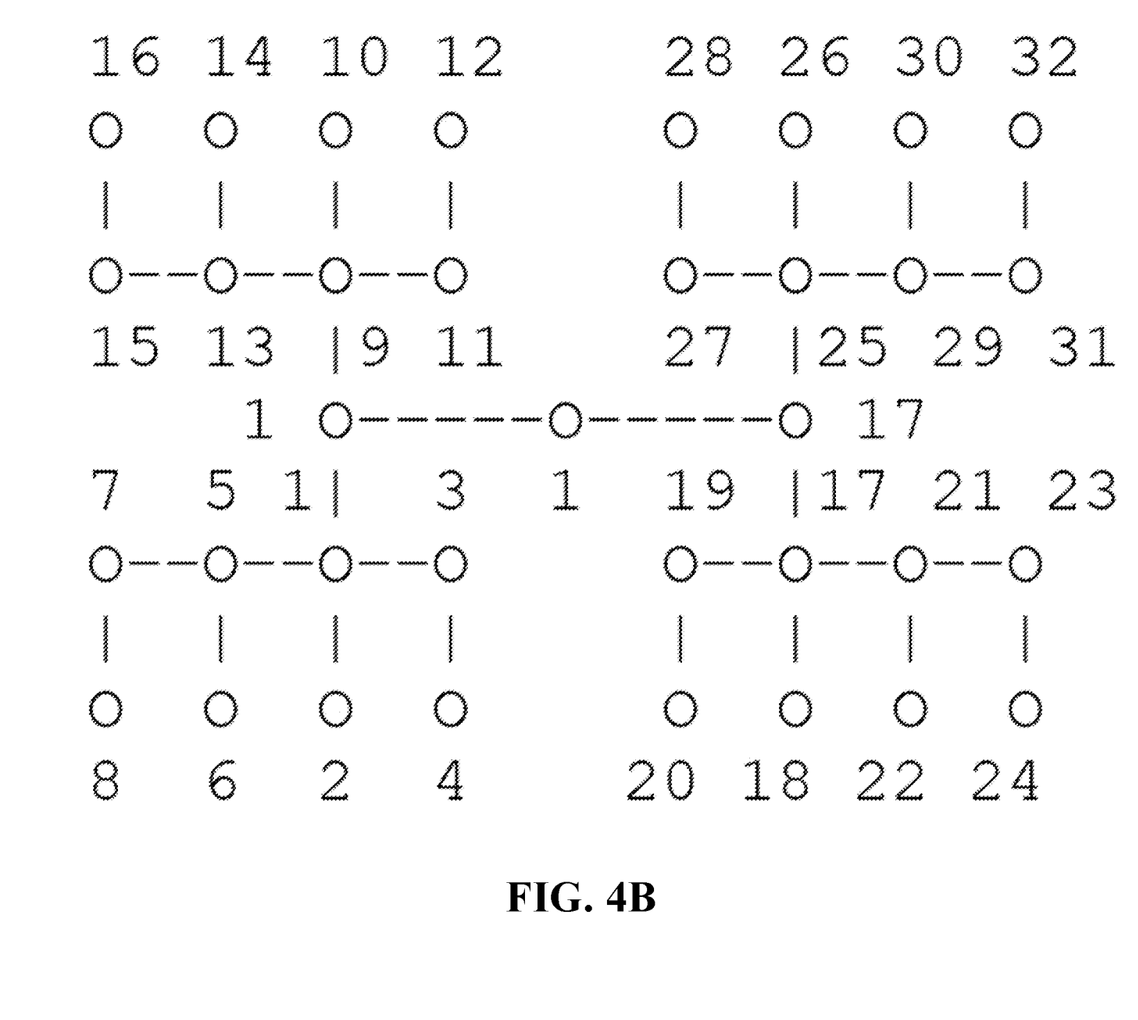

There are many different alternatives for spacing the qubits on a 2-D plane in order to have a tree-structure connections and in FIG. 4A we give an indicative architecture for a quantum data loader for vectors of dimension 32 that uses 35 qubits (32 corresponding to the qubits needed for the loader and 3 ancilla qubits that repeat some qubits so we can fit the loader in the grid) within a grid of dimensions 9×5. FIG. 4B illustrates how the 32 dimensions are mapped onto the qubits of the grid. Many alternative embodiments are possible, all following our method of an embedded tree-structure connectivity.

In FIGS. 4A and 4B, the "O" correspond to superconducting qubits and the horizontal (-) or vertical (|) connections correspond to the ability to perform a $BS(\theta)$ gate between the pair of qubits.

2. Implementation with Linear Optics

A gate within the family that we call $BS(\theta)$ may also be implemented on linear optics schemes by implementing Reconfigurable Beam Splitters, also referred to as Tunable Beam Splitters or Tunable Mach-Zender Interferometers.

Figure 5A:
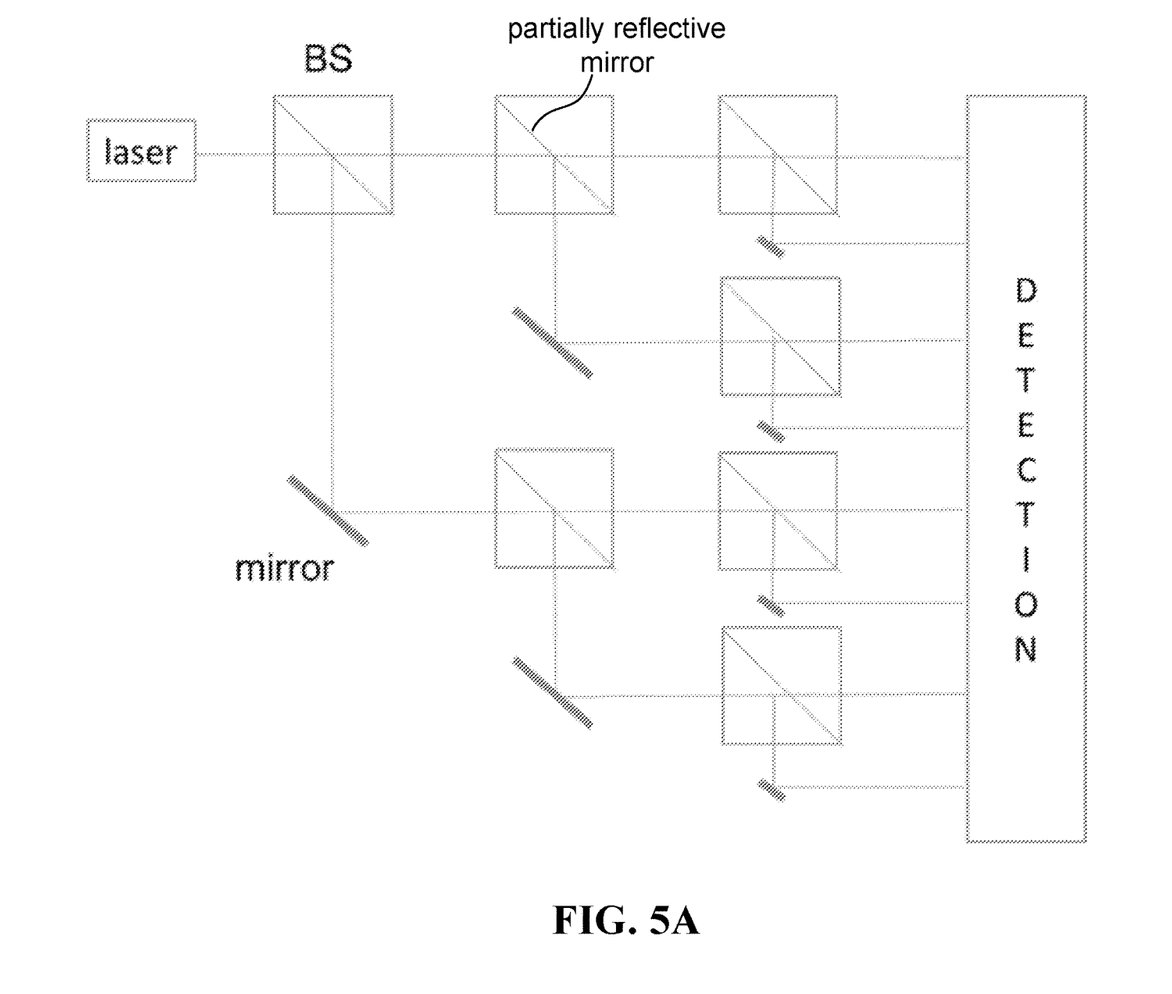
FIGS. 5A and 5B are diagrams showing possible hardware implementations of the quantum data loader using linear optics, according to some embodiments.

In FIG. 5A, reconfigurable beam splitters are implemented as partially reflective mirrors, according to an embodiment.

Figure 5B:
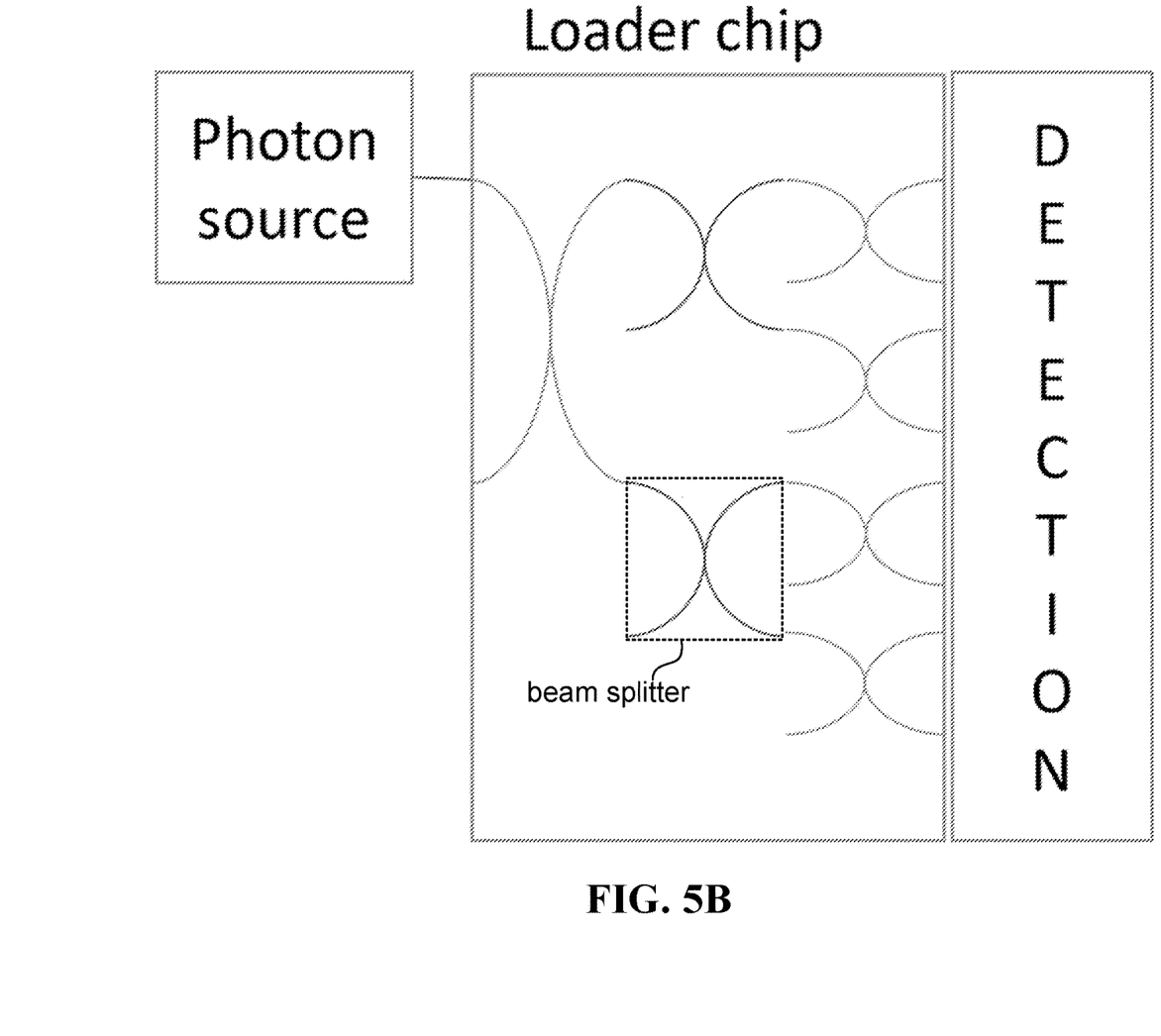

In FIG. 5B, we denote such a reconfigurable beam splitter as a gate with two inputs and two outputs that performs an operation of the family $BS(\theta)$. The reconfigurable beam splitter has a parameter $\theta$ (not illustrated) that corresponds to the ratio of reflectance versus transmittance (e.g., it splits coupled light with $\cos(\theta)$ being reflected and $\sin(\theta)$ being transmitted). The quantum data loader, as described in Part 1, can be now implemented using a single-photon source, reconfigurable Beam Splitters, and photon detectors.

In some embodiments, the quantum data loader, can be implemented in integrated photonic chips.

There are many different architecture alternatives in order to have a tree-structure connectivity and in FIGS. 5A and 5B we give an indicative architecture of a photonic linear optics scheme that can be used as a quantum data loader. Many alternative embodiments are possible, which follow our method of tree-structure connectivity.

Figure 6:
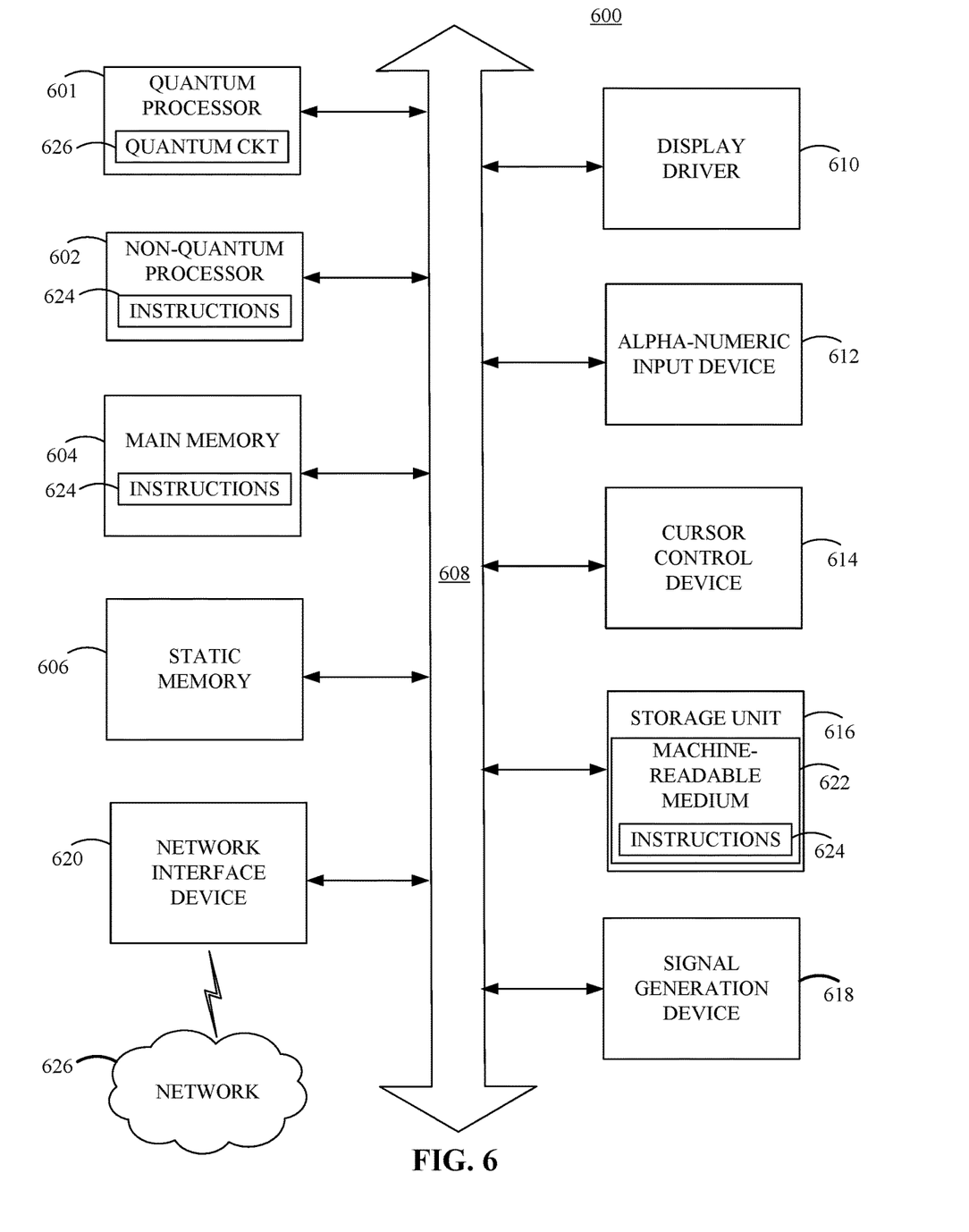
FIG. 6 is a block diagram illustrating components of an example computing system able to read instructions from a machine-readable medium and execute them in one or more processors including a quantum processor, according to an embodiment.

FIG. 6 is a block diagram illustrating components of an example computing system able to read instructions from a machine-readable medium and execute them in one or more processors (or controllers) including a quantum processor, according to some embodiments. Specifically, FIG. 6 shows a diagrammatic representation of a computer system 600. The computer system 600 can be used to execute instructions 624 (e.g., software) for causing the computing system to perform any one or more of the methodologies (or processes) described herein, such as method 100. In some embodiments, the computing system operates as a standalone device or a connected (e.g., networked) device that connects to other machines. In a networked deployment, the computing system may operate in the capacity of a server machine or a client machine in a server-client network environment, or as a peer machine in a peer-to-peer (or distributed) network environment. Note that FIG. 6 and its description describe an example device. Other computing systems with a quantum processors may operate differently and have more, less, and/or different components.

The example computer system 600 includes one or more processing units (e.g., processors 601 and 602). The conventional processor 602 is, for example, a central processing unit (CPU), a graphics processing unit (GPU), a digital signal processor (DSP), a controller, a state machine, one or more application specific integrated circuits (ASICs), or any combination of these.

The quantum processor 601 may be one or more physical devices that perform processing based upon quantum effects, one or more devices that act in such a way, or any other devices that may reasonably be interpreted as exhibiting quantum processing behavior. Quantum processors 601 exploit the laws of quantum mechanics in order to perform computations. Quantum processors 601 commonly use so-called qubits, or quantum bits, rather than the bits used in classical computers. Classical bits always have a value of either 0 or 1. Roughly speaking, qubits have a non-zero probability of existing in a superposition, or linear combination, of 0 and 1. Because quantum processors 601 operate on qubits, the ability of qubits to exist in superpositions of 0 and 1 allows for greatly enhanced performance for certain computational tasks. For example, Shor's algorithm describes how a quantum processor can be used to efficiently factor large integers, which has significant applications and implications for cryptography. Grover's search algorithm describes how a quantum processor can be used to efficiently search a large set of information, such as a list or database.

The quantum processor 601 may be able to configure and execute one or more quantum circuits 626. A quantum circuit is a model for quantum computation in which the computation is a sequence of quantum gates which are reversible transformations on one or more qubits.

The computer system 600 also includes a main memory 604. The computer system may include a storage unit 616. The processors 601 and 602, memory 604, and the storage unit 616 communicate via some communications media 608. For example, the conventional processor 602, main memory 604 and storage unit 616 may communicate over a bus, while the processors 602 and 601 communicate with each other over a separate, dedicated communications path.

In addition, the computer system 600 can include a static memory 606 and a display driver 610 (e.g., to drive a plasma display panel (PDP), a liquid crystal display (LCD), or a projector capable of displaying the UI 105 to a user). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the communications medium 608.

The storage unit 616 includes a machine-readable medium 622 on which is stored instructions 624 embodying any one or more of the methodologies or functions described herein. The instructions 624 may also reside, completely or at least partially, within the main memory 604 or within the processor 601 (e.g., within a processor's cache memory) during execution thereof by the computer system 600, the main memory 604 and the processor 601 may also constituting machine-readable media. The instructions 624 may be carried out in part by the quantum circuits 626, using methods described above. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A quantum circuit for use in encoding a first n-dimensional vector representing classical data into a first quantum state, encoding a second n-dimensional vector representing classical data into a second quantum state, and determining a distance between the first n-dimensional vector and the second n-dimensional vector, the quantum circuit comprising:
   2n qubits;
   a first layer comprising an X gate applied to one of the 2n qubits;
   a first group of subsequent layers that applies BS gates to the 2n qubits according to a binary tree pattern, wherein each BS gate is a single parametrized 2-qubit gate; and
   an additional layer after the first group of subsequent layers that applies BS gates in parallel to pairs of qubits of the 2n qubits, wherein a first qubit in a pair is associated with the first quantum state and a second qubit in the pair is associated with the second quantum state,
   wherein a number of layers including the first layer, the first group of subsequent layers, and the additional layer is not more than ceiling($\log_2$ (n)+3).

2. The quantum circuit of claim 1, wherein n is a power of 2.

3. The quantum circuit of claim 1, wherein a root node of the binary tree pattern is the qubit that the X gate is applied to.

4. The quantum circuit of claim 1, wherein a total number of qubits in the quantum circuit is not greater than 2n.

5. The quantum circuit of claim 1, wherein a total number of BS gates in the quantum circuit is not greater than 3n−1.

6. The quantum circuit of claim 1, wherein a number of layers of the first group of subsequent layers is a logarithmic number of n.

7. The quantum circuit of claim 1, wherein each BS gate in the first group of subsequent layers has a form:

$BS(\theta_j)=[[1,0,0,0],[0,\cos(\theta_j),\sin(\theta_j),0],[0,-\sin(\theta_j),\cos(\theta_j),0],[0,0,0,1]]$, where $\theta_j$ is an angle and j is an integer indicating a location of the BS gate in the binary tree pattern of the first group of subsequent layers.

8. The quantum circuit of claim 7, wherein $$\theta = \arccos\left(\frac{\|x\|}{\sqrt{\|x\|^2 + \|y\|^2}}\right)$$

for a first BS gate of the binary tree, wherein the first n-dimensional vector is $(x_1, x_2, \ldots, x_n)$, where $x_i$ is a real number, the second n-dimensional vector is $(y_1, y_2, \ldots, y_n)$, where $y_i$ is a real number, and the Euclidean norms of the first and second vectors are respectively $\|x\|^2=\Sigma_{i=1}^{n}|x_i|^2$ and $\|y\|^2=\Sigma_{i=1}^{n}|y_i|^2$.

9. The quantum circuit of claim 7, wherein $\theta=\pi/4$ for BS gates in the additional layer.

10. The quantum circuit of claim 1, wherein a probability of observing all zeros in the first n qubits is equal to the distance between the first n-dimensional vector and the second n-dimensional vector divided by four.

11. A quantum circuit for use in encoding a first n-dimensional vector representing classical data into a first quantum state, encoding a second n-dimensional vector representing classical data into a second quantum state, and determining a distance between the first n-dimensional vector and the second n-dimensional vector, the quantum circuit comprising:
  n qubits;
  a first layer comprising an X gate applied to one of the n qubits;
  a first group of subsequent layers that applies BS gates to the n qubits according to a binary tree pattern, wherein each BS gate is a single parametrized 2-qubit gate; and
  a second group of subsequent layers that that applies BS gates to the same n qubits according to an inverse of the binary tree pattern,
  wherein a number of layers including the first layer, the first group of subsequent layers, and the second group of subsequent layers is not more than ceiling($2 \log_2 (n)+1$).

12. The quantum circuit of claim 11, wherein n is a power of 2.

13. The quantum circuit of claim 11, wherein a root node of the binary tree pattern in the first group of subsequent layers is the qubit that the X gate is applied to.

14. The quantum circuit of claim 11, wherein a root node of the binary tree pattern in the second group of subsequent layers is the qubit that the X gate is applied to.

15. The quantum circuit of claim 11, wherein a total number of qubits in the quantum circuit is not greater than n.

16. The quantum circuit of claim 11, wherein a total number of BS gates in the quantum circuit is not greater than 2n−2.

17. The quantum circuit of claim 11, wherein the BS gates in the second group of subsequent layers are conjugate gates of the BS gates in the first group of subsequent layers.

18. The quantum circuit of claim 11, wherein each BS gate in the first group of subsequent layers has a form:

$BS(\theta_j)=[[1,0,0,0],[0,\cos(\theta_j),\sin(\theta_j),0],[0,-\sin(\theta_j),\cos(\theta_j),0],[0,0,0,1]]$, where $\theta_j$ is an angle and j is an integer indicating a location of the BS gate in the binary tree pattern of the first group of subsequent layers.

19. The quantum circuit of claim 18, wherein each BS gate in the second group of subsequent layers has a form:

$BS^+(\theta_j)=[[1,0,0,0],[0,\cos(\theta_j),-\sin(\theta_j),0],[0,\sin(\theta_j),\cos(\theta_j),0],[0,0,0,1]]$, where $\theta_j$ is an angle and j is an integer indicating a location of the BS gate in the inverse binary tree pattern of the second group of subsequent layers.

20. The quantum circuit of claim 11, wherein a number of BS gates in the second group of subsequent layers is equal to a number of BS gates in the first group of subsequent layers.

21. A method for executing a quantum circuit, the quantum circuit for use in encoding a first n-dimensional vector representing classical data into a first quantum state, encoding a second n-dimensional vector representing classical data into a second quantum state, and determining a distance between the first n-dimensional vector and the second n-dimensional vector, the method comprising:
  executing a first layer comprising an X gate applied to one of 2n qubits;
  executing a first group of subsequent layers that applies BS gates to the 2n qubits according to a binary tree pattern, wherein each BS gate is a single parametrized 2-qubit gate; and
  executing an additional layer after the first group of subsequent layers that applies BS gates in parallel to pairs of qubits of the 2n qubits, wherein a first qubit in a pair is associated with the first quantum state and a second qubit in the pair is associated with the second quantum state,
  wherein a number of layers including the first layer, the first group of subsequent layers, and the additional layer is not more than ceiling($\log_2 (n)+3$).

22. A non-transitory computer-readable storage medium comprising stored instructions for executing a quantum circuit, the quantum circuit for use in encoding a first n-dimensional vector representing classical data into a first quantum state, encoding a second n-dimensional vector representing classical data into a second quantum state, and determining a distance between the first n-dimensional vector and the second n-dimensional vector, the stored instructions, when executed by a computing system, cause the computing system to perform operations comprising:
  executing a first layer comprising an X gate applied to one of 2n qubits;
  executing a first group of subsequent layers that applies BS gates to the 2n qubits according to a binary tree pattern, wherein each BS gate is a single parametrized 2-qubit gate; and
  executing an additional layer after the first group of subsequent layers that applies BS gates in parallel to pairs of qubits of the 2n qubits, wherein a first qubit in a pair is associated with the first quantum state and a second qubit in the pair is associated with the second quantum state,
  wherein a number of layers including the first layer, the first group of subsequent layers, and the additional layer is not more than ceiling($\log_2 (n)+3$).

23. A method for executing a quantum circuit, the quantum circuit for use in encoding a first n-dimensional vector representing classical data into a first quantum state, encoding a second n-dimensional vector representing classical data into a second quantum state, and determining a distance between the first n-dimensional vector and the second n-dimensional vector, the method comprising:

executing a first layer comprising an X gate applied to one of n qubits;

executing a first group of subsequent layers that applies BS gates to the n qubits according to a binary tree pattern, wherein each BS gate is a single parametrized 2-qubit gate; and executing a second group of subsequent layers that that applies BS gates to the same n qubits according to an inverse of the binary tree pattern, wherein a number of layers including the first layer, the first group of subsequent layers, and the second group of subsequent layers is not more than ceiling($2 \log_2(n)+1$).

24. A non-transitory computer-readable storage medium comprising stored instructions for executing a quantum circuit, the quantum circuit for use in encoding a first n-dimensional vector representing classical data into a first quantum state, encoding a second n-dimensional vector representing classical data into a second quantum state, and determining a distance between the first n-dimensional vector and the second n-dimensional vector, the stored instructions, when executed by a computing system, cause the computing system to perform operations comprising:

executing a first layer comprising an X gate applied to one of n qubits;

executing a first group of subsequent layers that applies BS gates to the n qubits according to a binary tree pattern, wherein each BS gate is a single parametrized 2-qubit gate; and executing a second group of subsequent layers that that applies BS gates to the same n qubits according to an inverse of the binary tree pattern, wherein a number of layers including the first layer, the first group of subsequent layers, and the second group of subsequent layers is not more than ceiling($2 \log_2(n)+1$).

* * * * *